(12) United States Patent  
Laurent

(10) Patent No.: US 11,136,710 B2  
(45) Date of Patent: Oct. 5, 2021

(54) WRAPPABLE TEXTILE SLEEVE HAVING SUPPLEMENTAL LACE CLOSURE AND METHOD OF CONSTRUCTION THEREOF

(71) Applicant: FEDERAL-MOGUL POWERTRAIN LLC, Southfield, MI (US)

(72) Inventor: Benoit Laurent, Trosly Breuil (FR)

(73) Assignee: Federal-Mogul Powertrain LLC, Southfield, MI (US)

( * ) Notice: Subject to any disclaimer, the term of this patent is extended or adjusted under 35 U.S.C. 154(b) by 6 days.

(21) Appl. No.: 16/519,307

(22) Filed: Jul. 23, 2019

(65) Prior Publication Data

US 2019/0345667 A1    Nov. 14, 2019

Related U.S. Application Data

(62) Division of application No. 14/204,294, filed on Mar. 11, 2014, now Pat. No. 10,358,765.

(Continued)

(51) Int. Cl.
*D06H 5/00*    (2006.01)
*D03D 1/00*    (2006.01)
(Continued)

(52) U.S. Cl.
CPC .......... *D06H 5/005* (2013.01); *B65H 69/068* (2013.01); *D03D 1/0035* (2013.01); *D03D 1/0043* (2021.05); *D03D 13/00* (2013.01); *D04B 21/20* (2013.01); *D06H 5/002* (2013.01); *H02G 3/0481* (2013.01); *D10B 2403/0311* (2013.01);
(Continued)

(58) Field of Classification Search
CPC ........ D06H 5/005; D06H 5/002; D06H 5/006; D03D 2700/03; D03D 13/00; D03D 1/0035; D03D 3/04; D03D 1/0043; D03D 13/004; H02G 3/0481; D04B 21/20;
(Continued)

(56) References Cited

U.S. PATENT DOCUMENTS

| | | | | |
|---|---|---|---|---|
| 2,070,861 A | * | 2/1937 | Gillies | F16L 59/021 138/124 |
| 2,883,734 A | * | 4/1959 | Draper, Jr. | D21F 7/10 428/193 |
| 2,907,093 A | * | 10/1959 | Draper, Jr. | D21F 7/08 28/141 |
| 4,972,561 A | * | 11/1990 | Aldrich | D21F 1/0054 139/383 A |

(Continued)

FOREIGN PATENT DOCUMENTS

JP          60231841 A  * 11/1985

*Primary Examiner* — Amy Vanatta
(74) *Attorney, Agent, or Firm* — Robert L. Stearns; Dickinson Wright, PLLC

(57) ABSTRACT

A wrappable textile sleeve with closure system and method of construction is provided. The sleeve has a wall of interlaced yarn with opposite edges extending in a lengthwise direction along a longitudinal axis between opposite ends. The opposite edges are wrappable into overlapping relation with one another to form a tubular cavity. The wall has a first set of closed loops positioned adjacent one of the opposite edges and a second set of closed loops positioned adjacent the other of the opposite edges. At least one flexible lace is disposed through the closed loops in a zig-zag pattern, thereby extending back-and-forth between the first set of loops and the second set of loops. The flexible lace is slidable through the plurality of loops to facilitate drawing and maintaining the opposite edges in overlapping relation with one another.

18 Claims, 3 Drawing Sheets

Related U.S. Application Data

(60) Provisional application No. 61/775,897, filed on Mar. 11, 2013.

(51) Int. Cl.
 *D03D 13/00* (2006.01)
 *B65H 69/06* (2006.01)
 *D04B 21/20* (2006.01)
 *H02G 3/04* (2006.01)

(52) U.S. Cl.
 CPC ......... *D10B 2505/12* (2013.01); *Y10T 442/30* (2015.04); *Y10T 442/40* (2015.04)

(58) Field of Classification Search
 CPC ........ D10B 2403/0311; D10B 2505/12; B65H 69/068; Y10T 442/40; Y10T 442/30
 USPC .......................................................... 28/142
 See application file for complete search history.

(56) References Cited

U.S. PATENT DOCUMENTS

| | | | | |
|---|---|---|---|---|
| 5,027,862 A * | 7/1991 | Laybourn | F16L 55/17 138/99 |
| 5,662,147 A * | 9/1997 | Haiber | D03D 11/02 139/384 R |
| 6,233,796 B1 * | 5/2001 | van Wassenhove | D03D 3/02 28/100 |
| 6,260,555 B1 * | 7/2001 | Natvig | A45D 8/34 132/200 |
| 2001/0035225 A1 * | 11/2001 | Okawa | A44B 18/0023 139/383 R |
| 2006/0016507 A1 * | 1/2006 | Baer | D03D 17/00 139/383 R |
| 2006/0059715 A1 * | 3/2006 | Aveni | A43B 7/08 36/45 |
| 2011/0123759 A1 * | 5/2011 | Rodrigues | B60R 16/0215 428/100 |
| 2014/0305536 A1 * | 10/2014 | Gao | D03D 15/02 139/291 C |

* cited by examiner

FIG. 4A
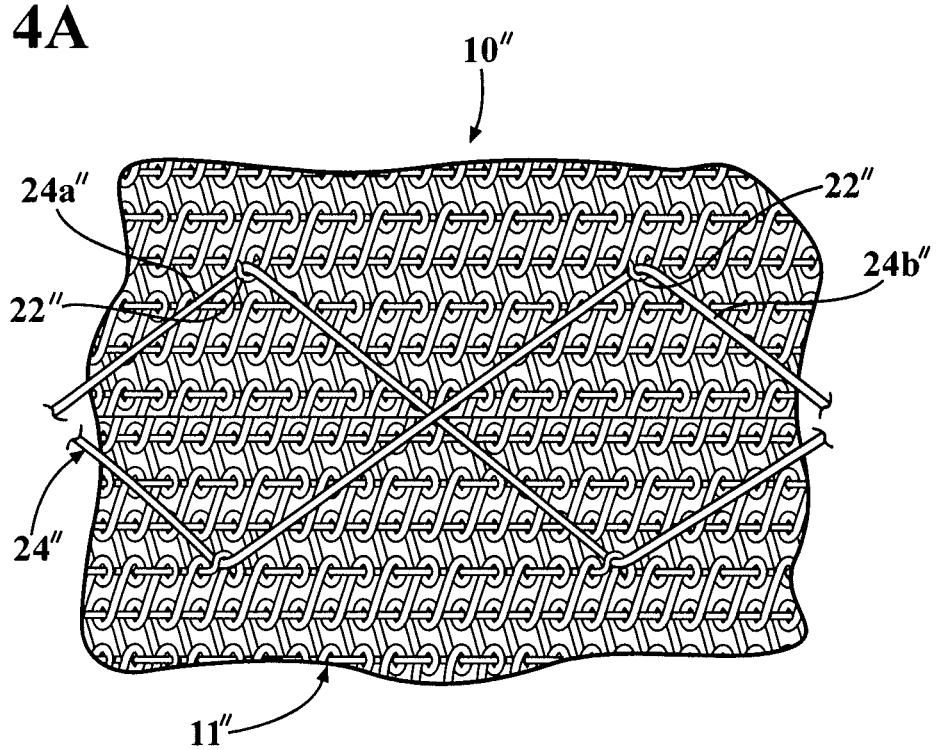
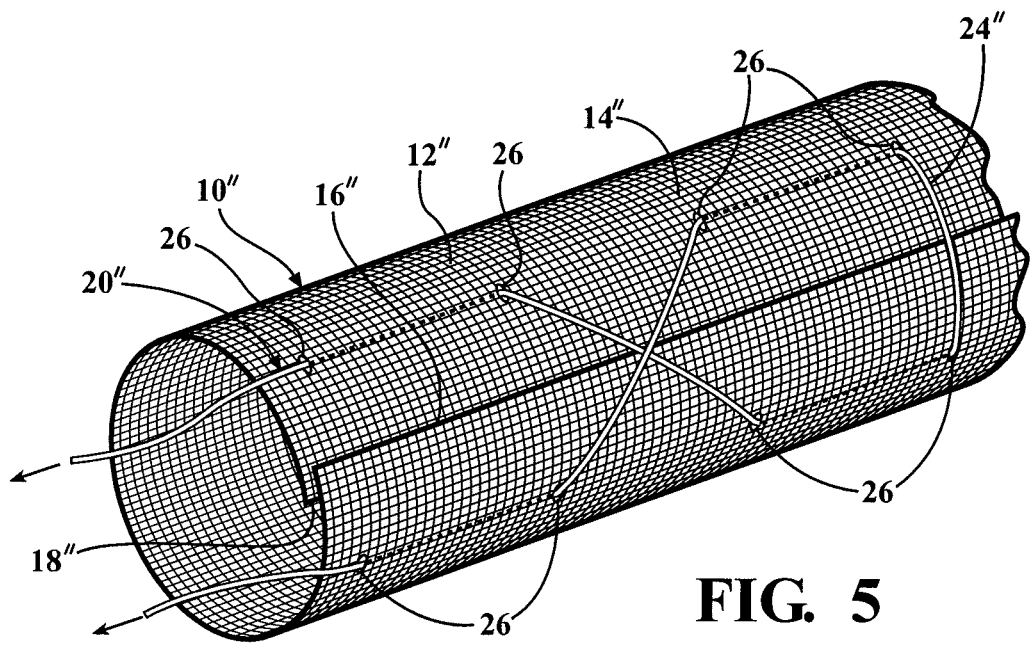
FIG. 5

WRAPPABLE TEXTILE SLEEVE HAVING SUPPLEMENTAL LACE CLOSURE AND METHOD OF CONSTRUCTION THEREOF

CROSS-REFERENCE TO RELATED APPLICATION

This U.S. Divisional Application claims the benefit of U.S. Utility application Ser. No. 14/204,294, filed Mar. 11, 2014 and U.S. Provisional Application Ser. No. 61/775,897, filed Mar. 11, 2013, both of which are incorporated herein by reference in its entirety.

BACKGROUND

1. Field of the Invention

This invention relates generally to self-wrapping textile sleeves, and more particularly to such sleeve having closure mechanisms and to their methods of construction.

2. Related Art

It is known in the industry, such as the aircraft and aerospace industries, to wrap wires harnesses and other elongate articles in self-wrapping textile sleeves. Such sleeves are woven from select textile yarns and are split along their length for receipt of the wire harness into a cavity of the sleeve. The split may be straight along the length, or may be twisted in a spiraling configuration. Some of the yarns in the fill direction of the sleeve are formed of heat-settable material and are heat-set to a curled shape so as to self-bias the sleeve into a closed, tubular form, with opposite edges forming the split overlapping one another. It is also common practice in the aircraft and aerospace industries to wrap such sleeves with a plurality of lacing tapes that are individually wrapped and knotted about the circumference of the sleeve at longitudinally spaced locations along its length. The individual wrapping and knotting nature of such lacing tapes makes the task of applying and securing them to the sleeve tedious, laborious and costly.

SUMMARY OF THE INVENTION

An improved wrappable textile sleeve has a wall of interlaced yarn with opposite edges extending in a lengthwise direction along a longitudinal axis of the sleeve between opposite ends. The opposite edges are wrappable into overlapping relation with one another to form an inner tubular cavity. The wall has a plurality of closed loops extending along the length of the wall with a first set of loops positioned adjacent one of the opposite edges and a second set of loops positioned adjacent the other of the opposite edges. At least one flexible lace is disposed through the plurality of closed loops in zig-zag relation, thereby extending from the first set of loops to the second set of loops and back to the first set of loops, and so on. The flexible lace is slidable through the plurality of loops to maintain the opposite edge in overlapping relation with one another.

The loops may be attached to the sleeve or may be formed as an integral part of the textile sleeve material. The loops are of a closed circumference construction so that the installer may first thread the lace loosely through the loops and then with a single action pull the lace tight. Accordingly, the installer is assured that the lace(s) will not fall out or otherwise become disassembled from the sleeve during the installation process. This is particularly advantageous in applications where the sleeve is long, such as the case with sleeves for aircraft and aerospace applications, which often extend several feet in length. The problem of the lace(s) becoming disassembled or loosened from of their intended location can be a problem with other types of lacing systems, such as with open eyelets, as shown, for example, in U.S. Pat. No. 2,070,861. The present lacing system has the advantage of proving a simple, quick and reliable approach to securing textile sleeves in the closed condition for the aircraft and aerospace industries. It has the further advantage of securing the sleeve along its full length, and enabling the lace to be first routed in a loose state, though being assured of remaining in the intended assembled state, and then drawn tight and tied in a subsequent synching operation.

In accordance with another aspect of the invention, the wall can be constructed as a woven wall with the first and second sets of closed loops formed from at least some of the woven yarn.

In accordance with another aspect of the invention, the wall can be constructed as a knit wall with the first and second sets of closed loops formed from at least some of the knit yarn.

In accordance with another aspect of the invention, a method of constructing a wrappable textile sleeve is provided. The method includes interlacing yarn to form a wall having opposite first and second edges extending in a lengthwise direction along a longitudinal axis of the sleeve between opposite ends, with the opposite edges being wrappable into overlapping one another to form an inner tubular cavity. Further, providing a first set of closed loops extending along the length of the wall adjacent the first edge, and providing a second set of closed loops extending along the length of the wall adjacent the second edge. Further yet, disposing at least one flexible lace through the first and second sets of closed loops in zig-zag relation through the first set of loops and the second set of loops, wherein the flexible lace is slidable through the first and second sets of loops to draw the opposite edge toward one another in overlapping relation with one another and to maintain the wall in a closed state.

The method of construction can further include forming the first and second sets of closed loops within the wall.

The method of construction can further include forming the first and second sets of closed loops from at least some of the interlaced yarn.

The method of construction can further include forming the wall in a weaving process with warp yarn extending in the lengthwise direction and weft yarn extending generally transversely to the lengthwise direction, and further yet, it can include forming the first and second sets of closed loops from at least some of the warp yarn.

The method of construction can further include forming the wall in a knitting process, and further yet, it can include forming the first and second sets of closed loops from at least some of the knit yarn.

The method of construction can further include heat-setting at least some of the weft yarn to bias the opposite edges of the sleeve wall into overlapping relation with one another.

The method of construction can further include forming the first and second sets of closed loops as eyelets within the yarn of the wall.

The method of construction can further include forming the first and second sets of closed loops in circumferential alignment with one another.

The method of construction can further include providing the first and second sets of closed loops by attaching loops of material, which is initially separate from the wall, to the wall.

The method of construction can further include extending a pair of flexible laces through the first and second closed loops with one of the flexible laces being fixed to one of the loops in the first set of closed loops and the other of the flexible laces being fixed to one of the loops in the second set of closed loops.

BRIEF DESCRIPTION OF THE DRAWINGS

These and other features and advantages of the present invention will be more readily appreciated when considered in connection with the detailed description and accompanying drawings, in which:

FIG. 4A is an enlarged fragmentary view of a wrappable textile sleeve with closure lace constructed in accordance with another aspect of the invention; and FIG. 5 is an enlarged fragmentary view of a wrappable textile sleeve with closure lace constructed in accordance with yet another aspect of the invention.

DETAILED DESCRIPTION OF PRESENTLY PREFERRED EMBODIMENTS

Figure 1:
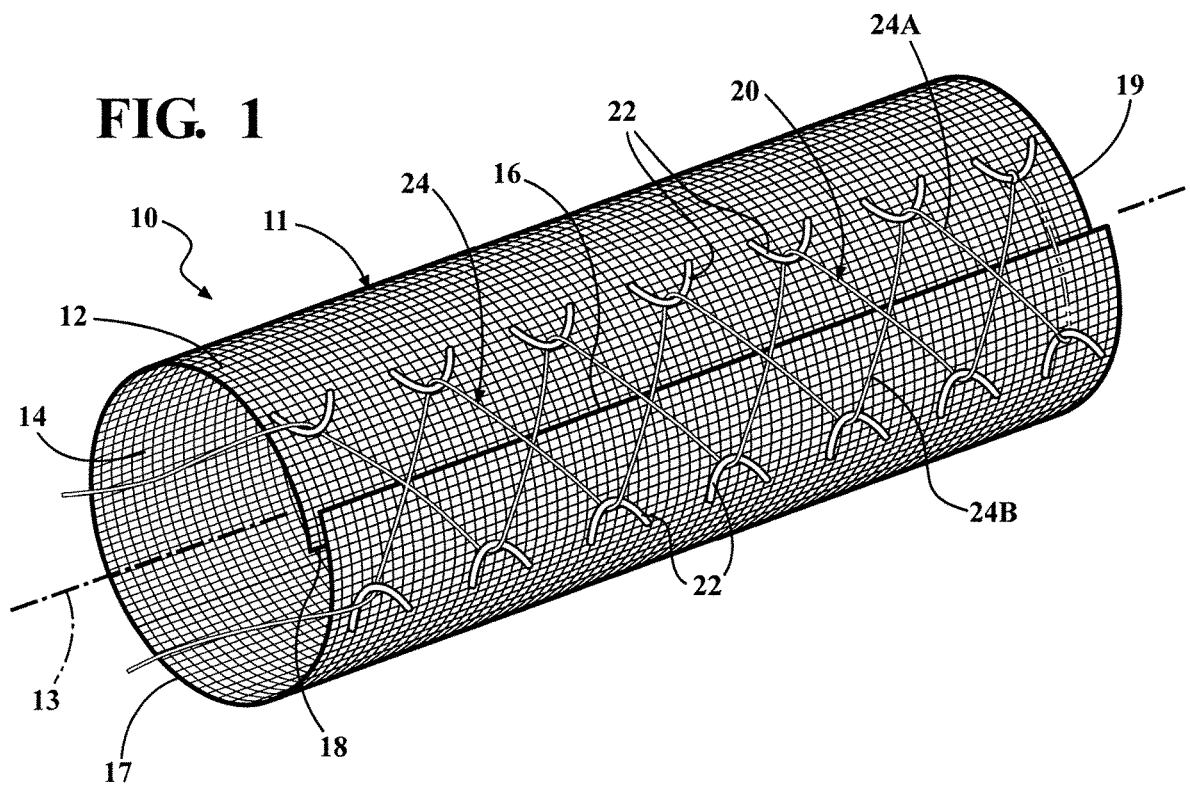
FIG. 1 is a perspective view of a wrappable textile sleeve with closure lace constructed in accordance with one aspect of the invention.

FIG. 1 schematically illustrates a wrappable textile sleeve 10 constructed in accordance with one aspect of the invention. The sleeve 10 has a wall 11 formed of interlaced yarn, wherein the interlacing is shown, by way of example and without limitation, as being a woven construction having a plurality of textile warps yarns 12 extending along a lengthwise direction generally parallel to a longitudinal axis 13 of the sleeve 10 and a plurality of weft or fill yarns 14 extending generally transversely to the longitudinal axis 13. The textile yarns 12, 14 may be fabricated of any of a number of materials. Such materials include, but are not limited to: organic polymeric materials (plastics), natural fibers, miner fibers, metallic yarns, non-metallic yarns, and/or combinations thereof. The yarns 12, 14 may be monofilament or may be multifilament or may be a combination of monofilament and multifilament. The textile yarns 12, 14 may be of the same or different diameters or denier. The sleeve 10 may be provided with a coating or other treatment on it interior and/or exterior surface, or may include additional layers as may be needed or desired for the particular application for which it may be utilized.

Figure 2:
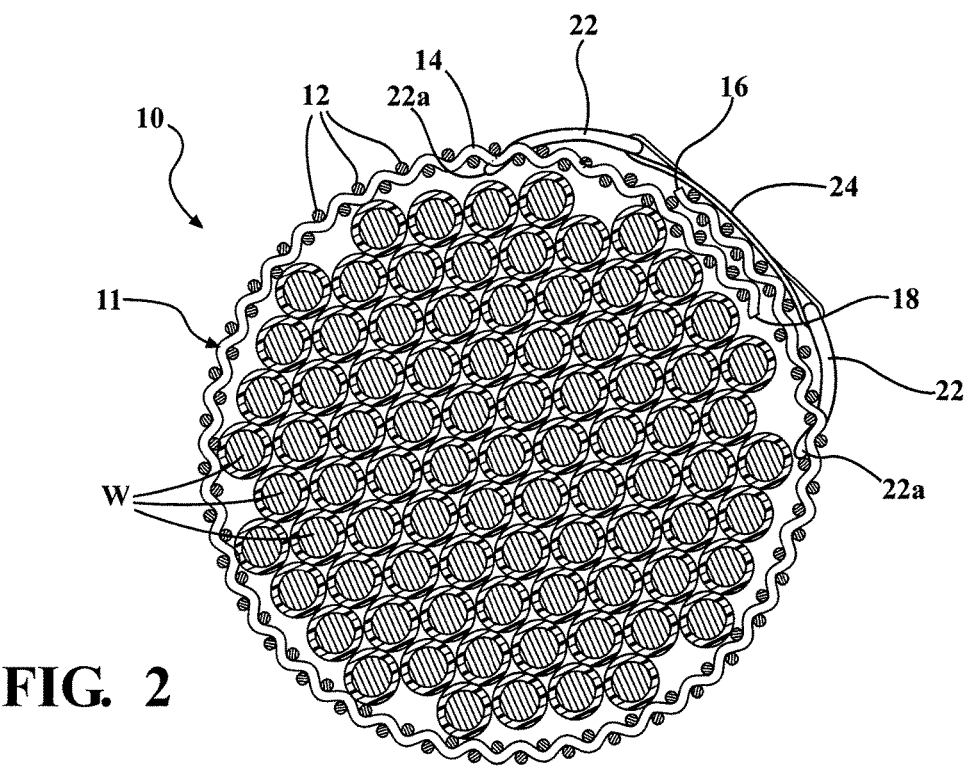
FIG. 2 is a cross-sectional view of the sleeve of FIG. 1.
Figure 3:
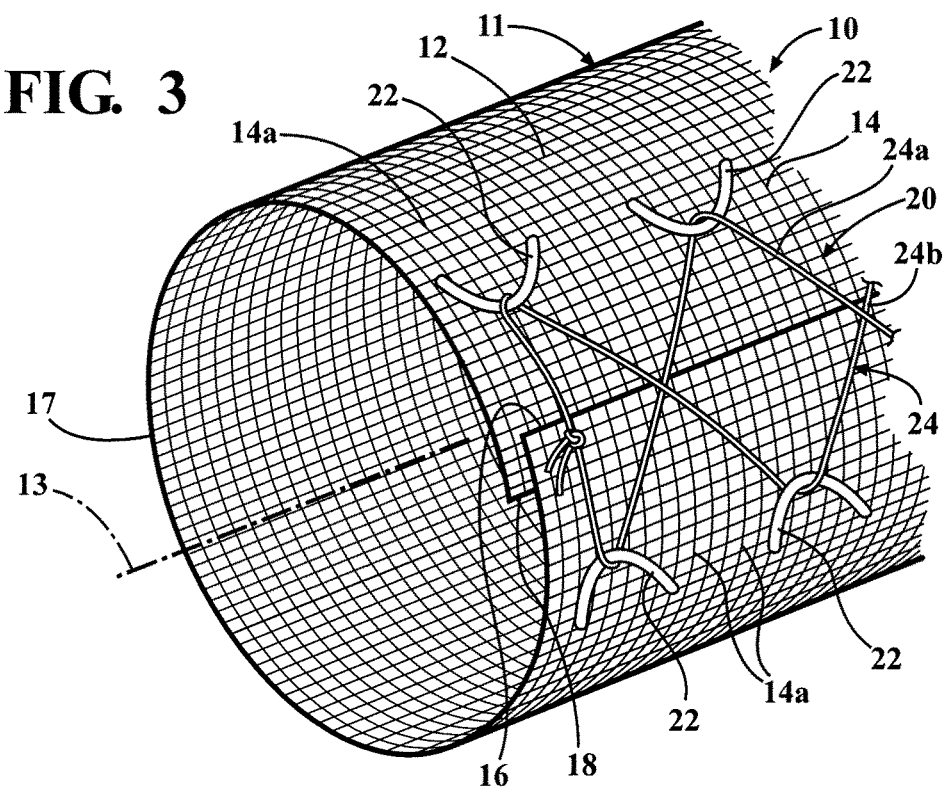
FIG. 3 is an enlarged fragmentary view of FIG. 1.

The tubular shape of the sleeve 10 may be achieved by fabricating the wall 11 of the sleeve 10 having a width extending between opposite edges 16, 18, between which the weft yarns 14 extend, and length extending between opposite ends 17, 19, between which the warp yarns 12 extend, and curling or wrapping the wall 11 into the tubular shape to form an inner tubular cavity in which an elongate member to be protected is received. Such a sleeve 10 has a split sleeve construction, sometimes referred to as an "open" sleeve, as illustrated in FIGS. 1-3, wherein the wall 11 of the sleeve 10 is parted or split along its length to present the opposite, overlapping sleeve edges 16, 18. The split may be straight in the longitudinal direction, thereby extending generally parallel to the longitudinal axis 13, or it may be twisted so as to spiral about the longitudinal axis 13.

At least some of the fill yarns 14 may be fabricated of a heat-shapeable or heat settable organic polymeric material 14a, which are well known per se in the art, and which enable the manufacturer of the sleeve to heat-set such fill yarns 14a in a pre-curved shape that biases the wall 11 of the sleeve 10 into a self-curled closed tubular condition, as illustrated best in FIG. 3, such that the opposite edges 16, 18 overlap one another. Such heat-shapeable yarns 14a may be monofilament yarns and may be made of known suitable polymeric materials such as, for example, polyphenylene sulfide (PPS) or polyethyleneterephthalate (PET).

The sleeve 10 may of the type used in the aircraft or aerospace industry for wrapping bundles of cables, such as wire harnesses W, as illustrated in FIG. 2. The sleeve 10, in addition to the self-wrapping closure system provided by the heat set yarns 14a that curl the sleeve 10 about the wire harness W into the tubular shape shown in FIGS. 1-3, is further be provided with a supplemental lace closure system 20. The lace closure system 20 comprises a plurality of closed loops 22 that are provided on the sleeve 10 at longitudinally spaced locations along its length and on circumferentially opposite sides of the split, thereby forming a first set of loops 22 positioned adjacent one of the opposite edges 16 and a second set of loops 22 positioned adjacent the other of the opposite edges 18. The loops 22 may be fabricated of textile material which may be of the same or different materials than that used for the sleeve 10. The loops 22 may be separately made and attached (e.g., sewn, clipped, or otherwise) to the textile sleeve 10 such that they having end portions 22a captured and retained by one or more yarns 12, 14 of the wall 11 according to the first embodiment. The loops 22 are spaced circumferentially from the edges 16, 18 to allow the edges 16, 18 to overlap one another without interference from the loops 22. Further, the loops 22 may be arranged directly opposite one another in loop pairs across the split, such that the pairs of loops 22 are circumferentially aligned with one another. A flexible lace 24 is routed in a simple crisscross, zig-zag figure-8 pattern through the loops 22 in the manner illustrated in FIGS. 1 and 3. The lace 24 may comprise a single strand that is routed midway its ends at one end 19 of the sleeve 10 and then the two lace sections fed in crisscrossing fashion through the loops 22 and alternating back and forth across the split toward the opposite end 17. Alternatively, as illustrated in FIG. 1, the lace 24 may comprise a pair of individual laces 24a, 24b with each lace 24a, 24b being fixed to a separate loop 22 of the separate first and second sets at one end 19 of the sleeve 10, such as being tied or knotted to the respective loop 22, and then guided in crisscrossing fashion toward the opposite end 17. The lace closure system 20 enables the installer to guide the lace(s) loosely through the loops 22 in the crisscross pattern. The closed nature of the loops 22 enables the lace(s) to be relaxed without concern for the lace(s) falling free of the loops 22. The ability to be confident that the lace(s) 24 is retained in the loops 22 is particularly advantageous in the aircraft and aerospace applications where the length of the sleeve 10 may extend 10 to 20 feet or more and where the split may be curved or twisted along the length of the sleeve 10. This is even more advantageous when the lacing task is to be performed by a single person. Once laced, the installer may tension the lace(s) 24 to draw them tight against the loops 22, thereby drawing the opposite loops 24 toward one another, and then tie off the free ends of the lace (s) 24 in a suitable knot to support the lace(s) 24 against loosening and to secure the sleeve 10 in the wrapped state about the wire harness W.

Figure 4:
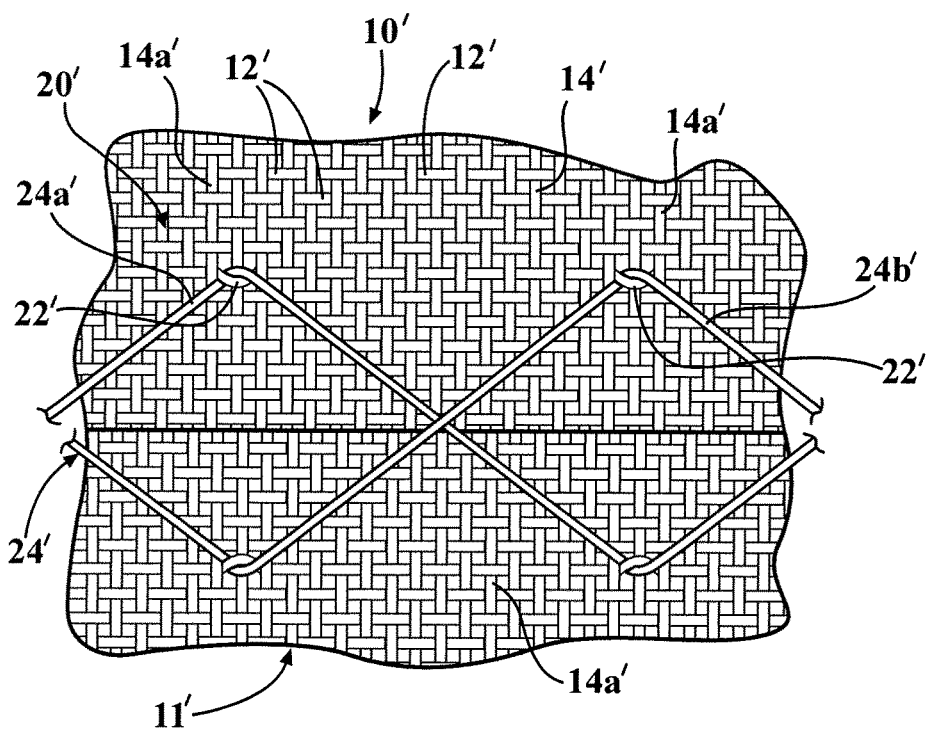
FIG. 4 is an enlarged fragmentary view of a wrappable textile sleeve with closure lace constructed in accordance with another aspect of the invention.

FIG. 4 illustrates an alternative embodiment of a self-curling sleeve 10' constructed in accordance with another aspect of the invention in which the loops 22' are fabricated as an integral part of an interlaced textile sleeve 10'. The same reference numerals are used to identify like features associated with the first embodiment, but are primed. One way of achieving this is to weave one or more warp yarns 12' with an amount of slack at selected spaced locations along the length of the sleeve 10', wherein the slack is located in desired locations of the loops 22'. Such warp yarn 12' is interlaced with circumferentially extending weft yarns 14' to support the warp yarn 12' in its multi-looped condition in the finished woven state of a wall 11' of the sleeve 10'. In the same way as the sewn on loops 22 of FIGS. 1-3, the lace(s) 24', 24a', 24b' is guided through the loops 22' in loose cross-cross fashion and then tightened and tied as before.

FIG. 4A illustrates an alternative embodiment of a self-curling sleeve 10" constructed in accordance with another aspect of the invention in which the loops 22" are fabricated as an integral part of an interlaced textile sleeve 10" having a knit wall 11". The same reference numerals are used to identify like features associated with the first embodiment, but are double primed. One way of achieving this is to knit one or more yarns with an amount of slack at selected spaced locations along the length of the sleeve 10", wherein the slack is located in desired locations of the loops 22". In the same way as the sewn or otherwise fastened on loops 22 of FIGS. 1-3, the lace(s)24", 24a", 24b" is guided through the loops 22" in loose cross-cross fashion and then tightened and tied as before.

FIG. 5 illustrates a further embodiment of a self-curling sleeve 10" constructed in accordance with yet another aspect of the invention wherein the same reference numerals are used to identify like features, but are double primed, and in which the loops are formed as closed holes or eyelets 26. The eyelets 26 are formed as an integral feature of the woven construction of the sleeve 10" The eyelets 26 are spaced in the same manner as that described above for the loops 22, and a lace or laces 24" are guided loosely through the eyelets 26 in a crisscross pattern such as in the manner illustrated in FIG. 5 and the lace then tightened and knotted the manner of the lace 24 of the first embodiment.

In accordance with another aspect of the invention, a method of constructing the wrappable sleeves is provided. The method includes those steps discussed above and summarized, as well as claimed hereafter.

Obviously, many modifications and variations of the present invention are possible in light of the above teachings and may be practiced otherwise than as specifically described while within the scope of the appended claims.

What is claimed is:

1. A method of constructing a wrappable textile sleeve, comprising:
    interlacing yarn to form a wall having opposite first and second edges extending in a lengthwise direction along a longitudinal axis of the sleeve between opposite ends, with the opposite edges being wrappable into overlapping relation with one another to form an inner tubular cavity;
    providing a first set of closed loops extending along the length of the wall adjacent the first edge;
    providing a second set of closed loops extending along the length of the wall adjacent the second edge;
    extending at least one flexible lace through the first and second sets of closed loops in zig-zag relation from the first set of loops to the second set of loops, wherein said at least one flexible lace is slidable through the first and second sets of loops to maintain the opposite edges in overlapping relation with one another;
    forming the first and second sets of closed loops within the wall;
    forming the first and second sets of closed loops from at least some of the interlaced yarn;
    forming the wall in a weaving process with warp yarn extending in the lengthwise direction and weft yarn extending generally transversely to the lengthwise direction; and
    forming the first and second sets of closed loops from at least some of the warp yarn.

2. The method of claim 1, further including heat-setting at least some of the weft yarn to bias the opposite edges into overlapping relation with one another.

3. The method of claim 1 further including forming the first and second sets of closed loops in circumferential alignment with one another.

4. The method of claim 1 further including extending a pair of flexible laces through the first and second closed loops with one of the flexible laces being fixed to one of the loops in the first set of loops and the other of the flexible laces being fixed to one of the loops in the second set of loops.

5. The method of claim 1 further including forming the first and second sets of closed loops in circumferentially spaced relation from the first and second edges.

6. The method of claim 1 further including forming the first and second sets of closed loops from monofilament yarn.

7. The method of claim 1 further including forming the first and second sets of closed loops from multifilament yarn.

8. A method of constructing a wrappable textile sleeve, comprising:
    weaving warp yarn extending in a lengthwise direction along a longitudinal axis of the sleeve with weft yarn extending generally transversely to the warp yarn to form a wall having opposite first and second edges extending in the lengthwise direction between opposite ends, with the opposite edges being wrappable into overlapping relation with one another to form an inner tubular cavity;
    forming a first set of closed loops adjacent the first edge from at least some of the warp yarn;
    forming a second set of closed loops adjacent the second edge from at least some of the warp yarn; and
    extending at least one flexible lace through the first and second sets of closed loops to facilitate bringing the opposite edge into overlapping relation with one another by pulling the at least one flexible lace.

9. The method of claim 8 further including forming the first and second sets of closed loops in circumferential alignment with one another.

10. The method of claim 8 further including forming the first and second sets of closed loops spaced circumferentially from the opposite edges.

11. The method of claim 8 further including providing the warp yarn as multifilament yarn.

12. The method of claim 8 further including providing the warp yarn as monofilament yarn.

13. The method of claim 8 further including providing the warp yarn as a combination of multifilament yarn and monofilament yarn.

14. The method of claim 13 further including forming the first and second sets of closed loops from the monofilament yarn.

15. The method of claim 13 further including forming the first and second sets of closed loops from the multifilament yarn.

16. The method of claim 8 further including heat-setting at least some of the weft yarn to bias the opposite edges into overlapping relation with one another.

17. The method of claim 8 further including extending the at least one flexible lace through the first and second sets of closed loops in zig-zag relation, wherein said at least one flexible lace is slidable through the first and second sets of closed loops.

18. The method of claim 8 further including aligning the first set of closed loops with one another along a length of the wall and aligning the second sets of closed loops with one another along the length of the wall.

\* \* \* \* \*